(12) United States Patent
Mizuno

(10) Patent No.: US 6,401,331 B1
(45) Date of Patent: Jun. 11, 2002

(54) RUBBER PLUG FITTING APPARATUS

(75) Inventor: Akihiro Mizuno, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/459,467

(22) Filed: Dec. 13, 1999

(30) Foreign Application Priority Data

Dec. 14, 1998 (JP) ............................................ 10-355093

(51) Int. Cl.[7] ................................................ B23P 21/00
(52) U.S. Cl. ............................... 29/771; 29/754; 29/809
(58) Field of Search ......................... 29/235, 450, 454, 29/785, 822, 748, 754, 809, 771; 221/177

(56) References Cited

U.S. PATENT DOCUMENTS

| | | | | | |
|---|---|---|---|---|---|
| 3,605,238 A | * | 9/1971 | Eschholz | ...................... | 29/235 |
| 3,680,191 A | * | 8/1972 | Cameron | ...................... | 29/235 |
| 4,653,182 A | * | 3/1987 | Fukuda et al. | ................. | 29/235 |
| 4,899,907 A | * | 2/1990 | Benani | ......................... | 29/809 |
| 5,323,530 A | * | 6/1994 | Goto et al. | .................... | 29/771 |
| 5,432,996 A | | 7/1995 | Imgrut et al. | | |
| 5,926,947 A | * | 7/1999 | Takano et al. | ................. | 29/809 |

FOREIGN PATENT DOCUMENTS

| | | |
|---|---|---|
| EP | 0 412 329 | 2/1991 |
| JP | 7-7833 | 1/1995 |
| JP | 7-015828 | 5/1995 |

* cited by examiner

Primary Examiner—S. Thomas Hughes
Assistant Examiner—Steven Blount
(74) Attorney, Agent, or Firm—Finnegan, Henderson, Farabow, Garrett & Dunner, L.L.P.

(57) ABSTRACT

A rubber plug fitting apparatus includes: a rubber plug feeding unit for feeding each of rubber plugs to a rubber plug feeding port; a rubber plug holder for holding one of the rubber plugs to fit the rubber plug on a wire; and a rotary unit having a plurality of rubber plug holding rods which are fitted into each of the rubber plugs to hold the rubber plugs. The rotary unit rotationally moves each of the rubber plug holding rods between the rubber plug feeding unit and the rubber plug holder. In the apparatus, a pair of rubber plug guides are provided so as to be capable of being opened/closed at a side of the rubber plug feeding port of the rubber plug feeding unit; and guide grooves are respectively provided at positions of the pair of rubber plug guides facing the rubber plug feeding port.

2 Claims, 5 Drawing Sheets

RUBBER PLUG FITTING APPARATUS

BACKGROUND OF THE INVENTION

1. Field of the Invention

The present invention relates to a rubber plug fitting apparatus for fitting a rubber plug on an end portion of a wire.

2. Description of the Related Art

The present disclosure relates to subject matters contained in Japanese Patent Application Laid-Open No. HEI 7-7833, filed on May 2, 1994, the disclosure of which is expressly incorporated herein by reference in its entirety. FIGS. 1 to 3 are schematic configuration views illustrating respective steps of the rubber plug fitting apparatus. In FIGS. 1 to 3, a rubber plug feeding unit 2, a rubber plug positioning unit 3 and a rubber plug holder 4 are respectively arranged at 90° intervals around a rotation center of a rotary unit 1 and at positions corresponding to an outer periphery thereof.

The rotary unit 1 has rubber plug holding rods 1a which are respectively arranged at 90° intervals and which are rotationally movable. The rubber plug feeding unit 2 has a rubber plug accommodation passage 2a where a number of rubber plugs 5 are arranged, and it comprises an inside pin 2b which is movable from a position where the inside pin 2b is inserted into a wire passing-through hole (not shown) of the forefront one of the rubber plugs 5 which have been accommodated in the rubber plug accommodation passage 2a up to a position where the forefront rubber plug 5 abuts on the rubber plug holding rod 1a of the rotary unit 1, and a pushing rod 2c for pushing the forefront rubber plug 5 onto the rubber plug holding rod 1a of the rotary unit 1.

The rubber plug positioning unit 3 has a positioning plate 3a formed with a small hole 3b, and the positioning plate 3a is movable between a spaced position (shown in FIG. 1) where it is spaced from the rotary unit 1 and an approached position (shown in FIGS. 2 and 3) where it approaches to the rotary unit 1. Also, the rubber plug holder 4 comprises a pair of rubber holding portions 4a, 4a which can be opened/closed and which are movable between a spaced position (shown in FIG. 3) where they are spaced from the rotary unit 1 and an approached position (shown in FIGS. 1, 2) where they approach to the rotary unit 1, and a pair of wire guide portions 4b, 4b which can be opened/closed and which are movable between a spaced position (shown in FIGS. 1, 2) where they are spaced from the pair of rubber plug holding portions 4a, 4a and an approached position (shown in FIG. 1) where they approach to the pair of rubber plug holding portions 4a, 4a. A wire W whose outer cover has been stripped at its end portion Wa is disposed at a position corresponding to the rubber plug holder 4.

Next, operation of the above structure will be explained. Each rubber plug holding rod 1a of the rotary unit 1 is stopped at positions corresponding to the rubber plug feeding unit 2, the rubber plug positioning unit 3 and the rubber plug holder 4 sequentially according to rotation of the rotary unit 1. Then, at the position corresponding to the rubber plug feeding unit 2, the inside pin 2b is caused to pass through the wire passing-through hole of the forefront one of the rubber plugs 5 which have been accommodated in the rubber plug accommodation passage 2a and a leading end of the forefront rubber 5 is caused to abut on the rubber plug holding rod 1a. Next, the pushing rod 2c pushes the forefront rubber plug 5 to the rubber plug holding rod 1a side, and, by the pushing force of the pushing rod 2c, the rubber plug 5 is guided by the inside pin 2b to be fitted on the rubber plug holding rod 1a. At the position corresponding to the rubber plug positioning unit 3, the positioning plate 3a is moved from the spaced position to the approached position. In the course of movement of the positioning plate 3a, the rubber plug 5 is pushed by the positioning plate 3a while the rubber plug holding rod 1a is being inserted into the small hole 3b. By this pushing, the rubber plug 5 is fitted up to a predetermined position on the rubber plug holding rod 1a. At the position corresponding to the rubber plug holder 4, the rubber plug 5 is released from the rubber plug holding rod 1a by the pair of rubber holding portions 4a, 4a and the pair of wire guide portions 4b, 4b, and the rubber plug 5 which has been released is fitted on the wire W.

In the conventional rubber plug fitting apparatus, however, since the inside pin 2b is inserted into the rubber plug 5 so as to guide the same, it is necessary to set the diameter of the inside pin 2b to be equal to or less than the inner diameter (diameter of the wire passing-through hole) of the rubber plug 5. Accordingly, for a rubber plug 5 with a very small inner diameter, the diameter of the inside pin 2b is reduced according to the very small inner diameter, and the inside pin 2b is easy to break, which results in lack of durability of the inside pin 2b.

Also, since positioning the rubber plug 5 which has been fitted on the rubber plug holding rod 1a is performed by the rubber plug positioning unit 3 independent of the rubber plug feeding unit 2, there is a problem where, in view of the whole body of the conventional rubber plug fitting apparatus, its structure becomes complicated and its manufacturing cost is increased.

SUMMARY OF THE INVENTION

In view of the above, the present invention has been achieved, and an object thereof is to provide an inexpensive rubber plug fitting apparatus which can perform a fitting of a rubber plug on a wire without any possibility of injury of parts or the like irrespective of the inner diameter of a rubber plug, which has an excellent durability, and which can perform a positioning of the rubber plug with a simple structure where a dedicated positioning unit is not used.

According to a first aspect of the present invention, there is provided a rubber plug fitting apparatus, comprising: a rubber plug feeding unit for feeding each of rubber plugs to a rubber plug feeding port; a rubber plug holder for holding one of the rubber plugs to fit the rubber plug on an end portion of a wire; and a rotary unit having a plurality of rubber plug holding rods which are fitted into each of the rubber plugs to hold the rubber plugs, the rotary unit rotationally moving each of the rubber plug holding rods between the rubber plug feeding unit and the rubber plug holder so that each of the rubber plugs can be delivered from the rubber plug feeding unit to the rubber plug holder through each of the rubber plug holding rods, wherein a pair of rubber plug guides are provided so as to be capable of being opened/closed at a side of the rubber plug feeding port of the rubber plug feeding unit; and wherein guide grooves are respectively provided at positions of the pair of rubber plug guides facing the rubber plug feeding port, so that the guide grooves guide an outer periphery of each of the rubber plugs which moves from the rubber plug feeding port to a side of each rubber plug holding rod when the pair of rubber plug guides are closed.

In the rubber plug fitting apparatus according to the first aspect, since a rubber plug is fitted on each of rubber plug holding rods by guiding the outer periphery of the rubber plug by respective grooves of a pair of rubber plug guides, there occurs no weak portion on the pair of rubber plug guides even when the inner diameter of the rubber plug is small, fitting of the rubber plug can be performed without injuring parts of the rubber plug fitting apparatus or the like irrespective of the diameter of the rubber plug, and the durability of a rubber plug fitting apparatus can be improved. Also, since there occurs no trouble such as a part injury and a rubber feeding can be surely carried out, the rubber plug fitting apparatus is prevented from being stopped due to any feeding failure, which results in improvement in productivity.

According to a second aspect of the present invention, as it depends from the first aspect, there is provided a rubber plug fitting apparatus, wherein stopper portions are respectively provided at the respective guide grooves of the pair of rubber plug guides so that the stopper portions restrict movement stroke of the rubber plug where the rubber plug moves from the rubber plug feeding port to the side of the rubber plug holding rod.

In the rubber plug fitting apparatus according to the second aspect, since stopper portions for restricting movement of a rubber plug moving from a rubber plug feeding port to a side of each rubber plug holding rod are respectively provided at respective guide grooves of a pair of rubber plug guides, a rubber plug is fitted up to a position on each rubber plug holding rod the where it abuts on the respective stopper portions, so that the rubber plug can be positioned on a predetermined position on each rubber plug holding rod. Thereby, positioning a rubber plug can be performed with a simple structure and without using a dedicated unit, so that cost of the whole body of the apparatus can be reduced. Also, since a step of positioning a rubber plug can be omitted, productivity can be further improved owing to the omission.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
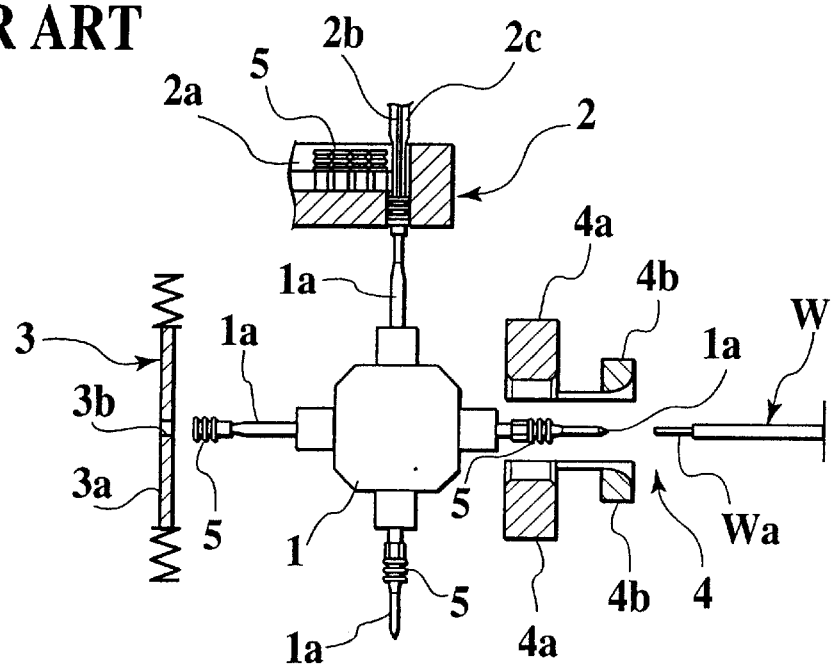
FIG. 1 is a schematic configuration view illustrating a rubber plug fitting apparatus according to a conventional example.
Figure 2:
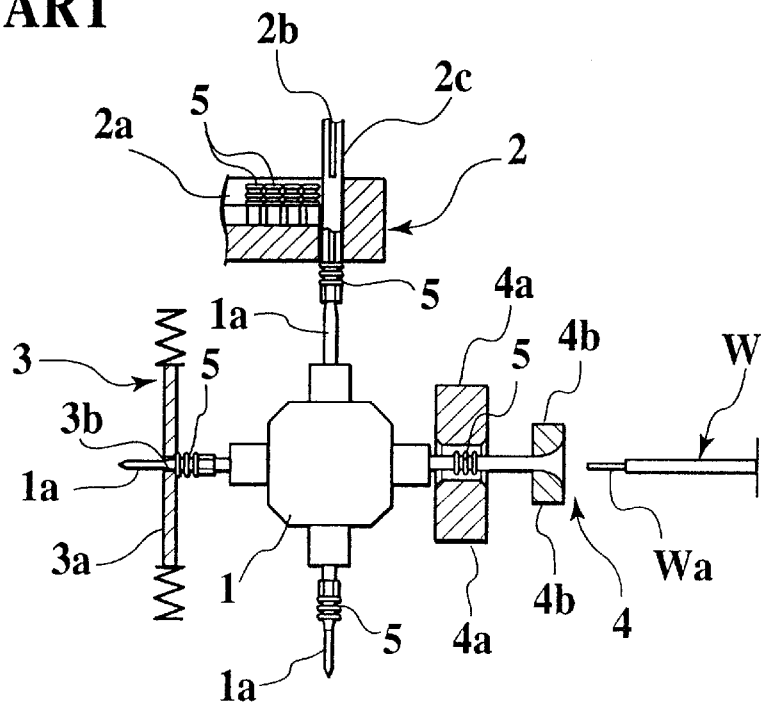
FIG. 2 is a schematic configuration view illustrating the rubber plug fitting apparatus according to the conventional example.
Figure 3:
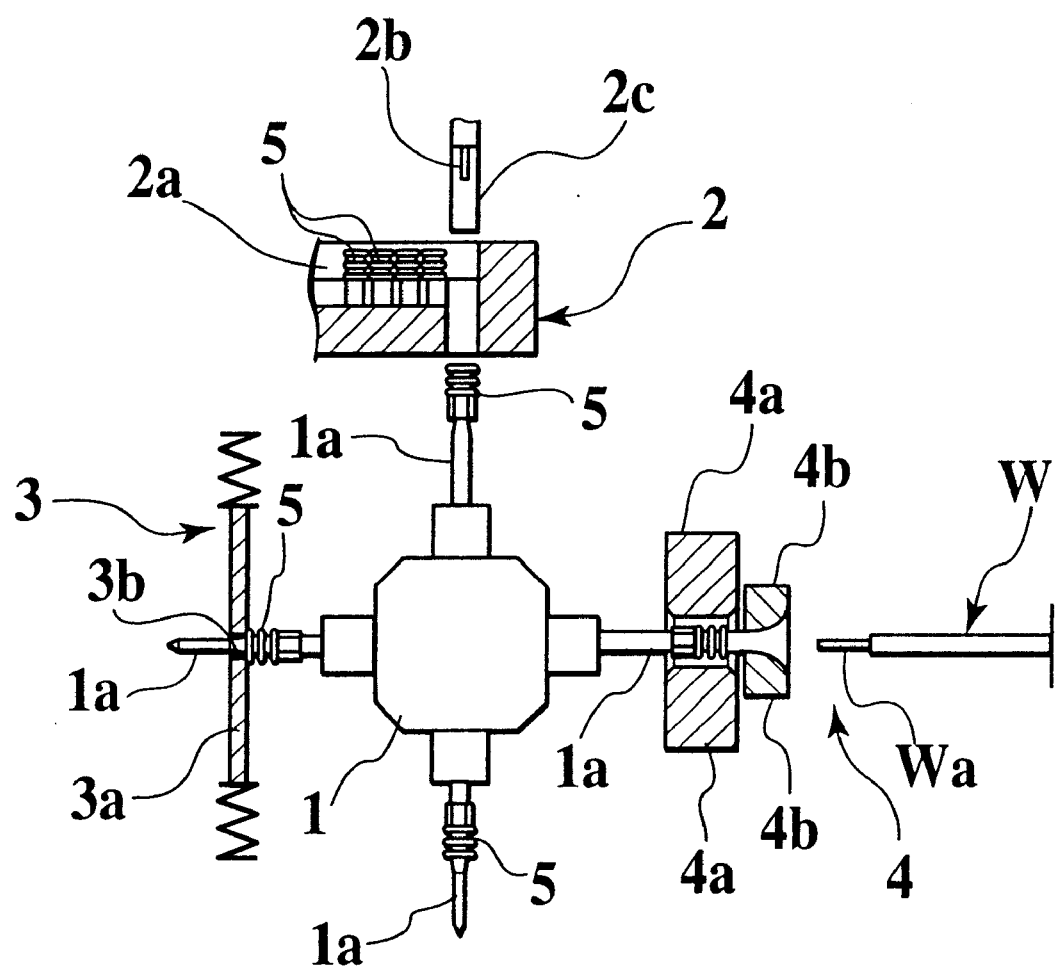
FIG. 3 is a schematic configuration view illustrating the rubber plug fitting apparatus according to the conventional example.

There will be detailed below the preferred embodiments of the present invention with reference to the accompanying drawings. Like members are designated by like reference characters.

Figure 4A:
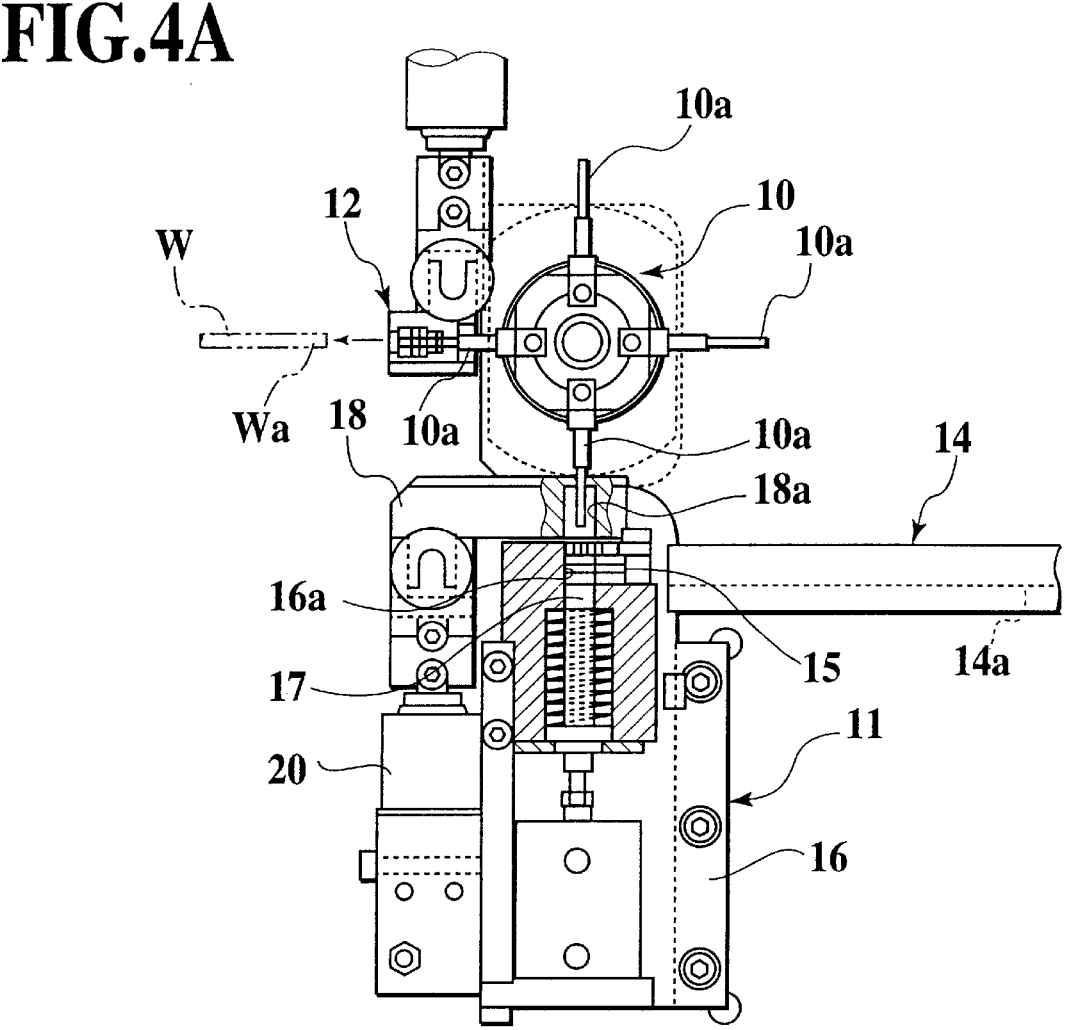
FIG. 4A is a side view illustrating of a rubber plug fitting apparatus according to one embodiment with a partial section.
Figure 4B:
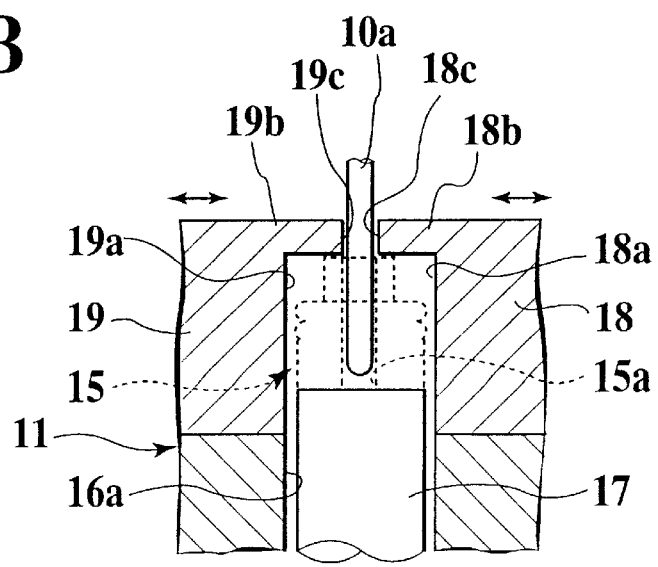
FIG. 4B is an enlarged sectional view of a main portion of the rubber fitting apparatus.
Figure 5:
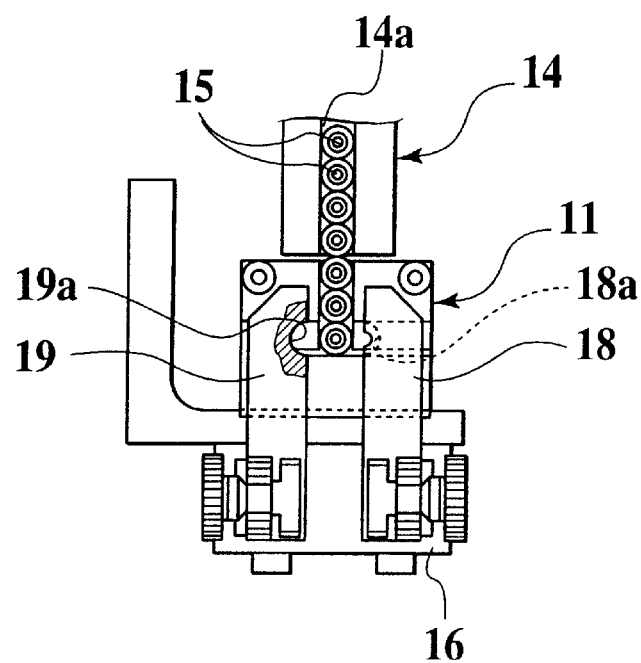
FIG. 5 is a plan view of a main portion illustrating a state where a pair of rubber plug guides used in the rubber plug fitting apparatus have been opened.
Figure 6:
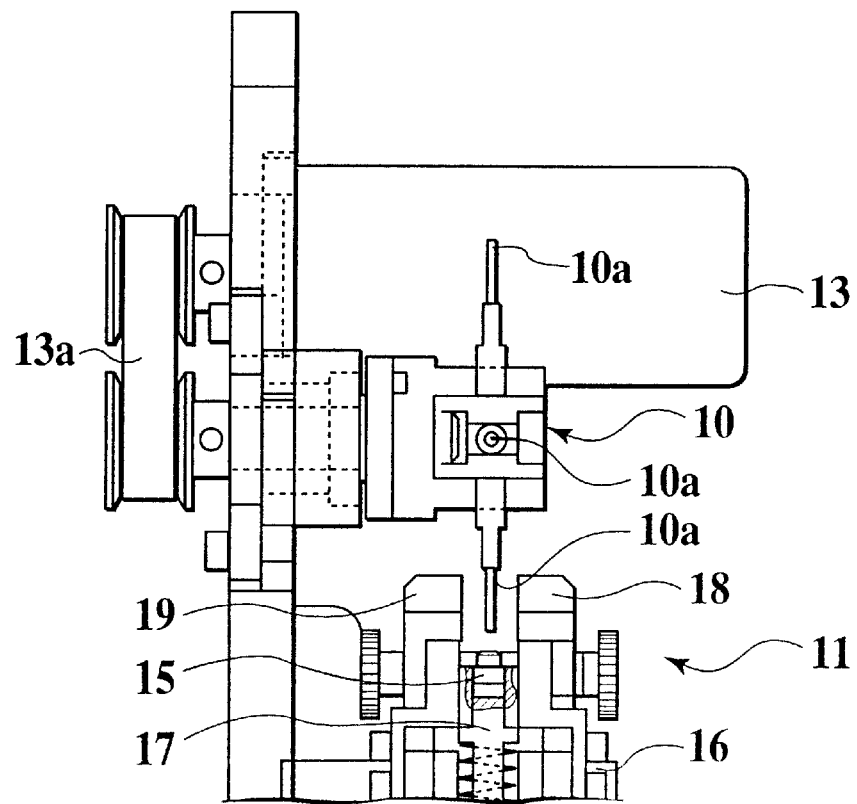
FIG. 6 is a front view of a main portion illustrating a state where the pair of rubber plug guides have been closed.
Figure 7:
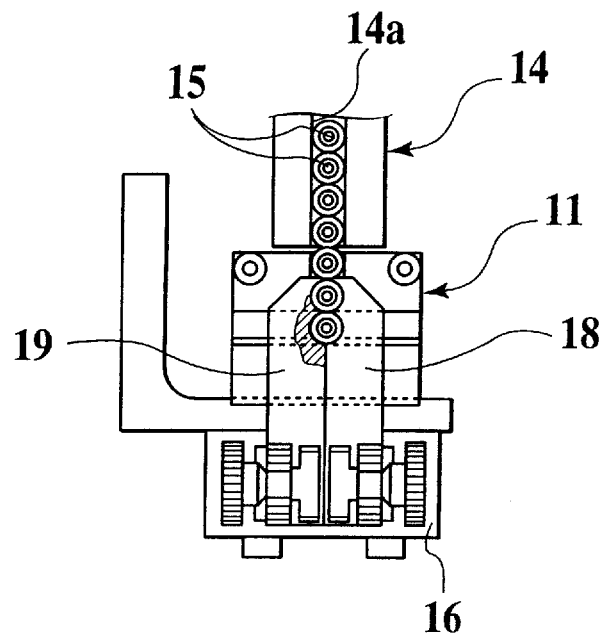
FIG. 7 is a plan view of a main portion illustrating a state where the pair of rubber plug guides have been closed.
Figure 8:
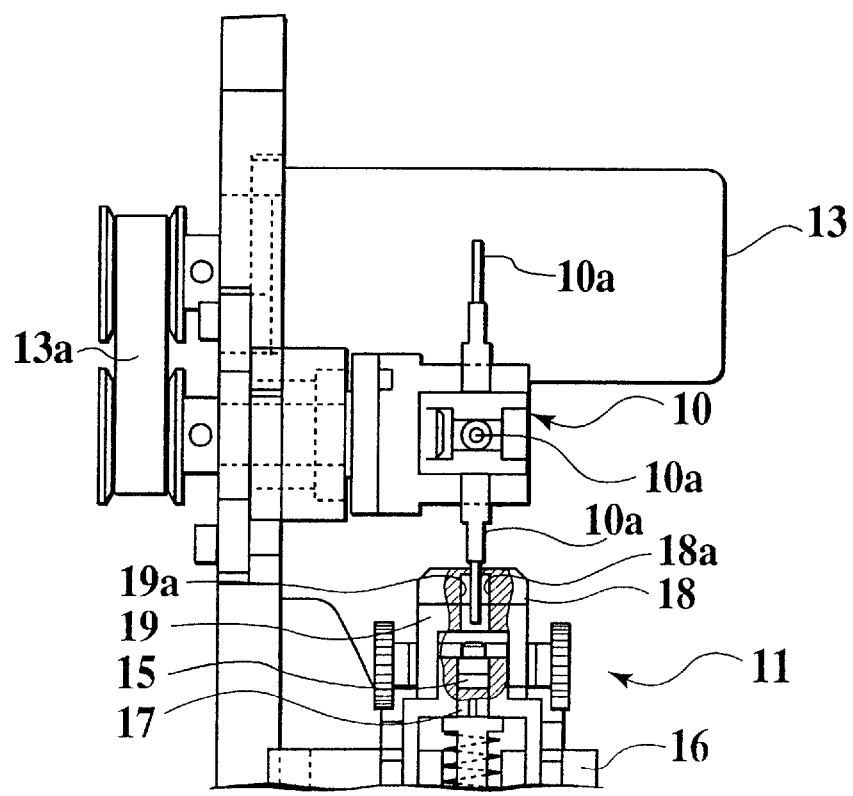
FIG. 8 is a front view of a main portion illustrating a state where the pair of rubber plug guides have been closed.

FIG. 4A is a side view of a rubber plug fitting apparatus according to an embodiment of the present invention, FIG. 4B is an enlarged sectional view of a main portion of the rubber plug fitting apparatus, FIG. 5 is a plan view of a main portion of a pair of rubber plug guides used in the rubber plug fitting apparatus which have been opened, FIG. 6 is a front view of a main portion of the pair of rubber plug guides which have been opened, FIG. 7 is a plan view of a main portion of the pair of rubber plug guides which have been closed, and FIG. 8 is a front view of a main portion of the pair of rubber plug guides which have been closed.

As illustrated in FIG. 4A, a rubber plug fitting apparatus is provided with a rotary unit 10, and it includes a rubber plug feeding unit 11 and a rubber plug holder 12 which are respectively provided at 90° intervals about a rotation center of the rotary unit 10 and at positions opposed to the outer periphery of the rotary unit 10.

The rotary unit 10 has rubber plug holding rods 10a which are respectively disposed at 90° rotation intervals, and the respective rubber plug holding rods 10a are constituted so as be rotationally movable integrally. The rotary unit 10 has a driving motor 13, and rotation of the driving motor 13 is transmitted to the respective rubber plug holding rods 10a via a belt 13a and the like.

The rubber plug feeding unit 11 has a straight advancing feeder 14, and the straight advancing feeder 14 is provided with a rubber plug accommodation passage where a number of rubber plugs 15 are aligned and disposed. A distal end of the rubber plug accommodation passage 14a is opened to a rubber plug feeding port 16a of a rubber plug feeding body 16, and the forefront rubber plug 15 of rubber plugs 15 in the rubber plug accommodation passage 14a is disposed in the rubber plug feeding port 16a. The rubber plug feeding body 16 is provided with a pushing rod 17 movable upward and downward, and the pushing rod 17 is disposed so as to be positioned below the rubber plug feeding port 16a when it is put in its lower position. When the pushing rod 17 is moved upward, the rubber plug 15 at the rubber plug feeding port 16a is pushed to a side of the rubber plug holding rod 10a of the rotary unit 10.

Also, a pair of rubber plug guides 18, 19 are provided on the rubber plug feeding body 16, and the pair of rubber plug guides 18, 19 are moved in a opening/closing manner between an opened position and a closed position by parallel cylinders (driving source) 20. As illustrated in FIGS. 5 and 6, when the pair of rubber plug guides 18, 19 are opened, respective opposing faces of the pair of rubber plug holding rods 10a are positioned to be spaced from each other, and thus the rubber plug holding rods 10a are positioned at positions where they do not interfere with rotational movement of each rubber plug holding rod 10a. Also, as illustrated in FIGS. 4A, 4B, 7 and 8 the respective opposing faces of the pair of rubber plug guides 18, 19 are positioned to be caused to abut on each other, when the pair of rubber plug guides are closed.

A semicircular guide grooves 18a, 19a are provided on the respective opposed faces of the pair of rubber plug guides 18, 19, and a cylindrical space is formed by the pair of guide grooves 18a, 19a, when the pair of rubber plug guides 18, 19 are closed. The diameter of the guide space is set to be equal to or slightly more than the maximum outer diameter of the rubber plug 15. A distal end of each rubber plug holding rod 10a is disposed in the guide space and a lower face of the guide space is opened to the rubber plug feeding port 16a.

Also, stopper portions 18b, 19b projecting above the respective guide grooves 18a, 19a are integrally formed on upper end portions of the pair of rubber plug guides 18, 19, and upward movement of the rubber plug 15 is restricted by the respective stopper portions 18b, 19b when the pair of rubber plug guides 18, 19 are put in a closed position. Semicircular grooves 18c, 19c through which the rubber plug holding rod 10a passes are respectively provided on the stopper portions 18b, 19b.

The rubber plug holder 12 is structured so as to pull the rubber plug 15 from the rubber plug holding rod 10a and fit the rubber plug 15 which has been pulled out on an end portion Wa of a wire W. Unlike the conventional example, fitting operation of the wire W is performed without stripping an outer cover on the end portion Wa.

Next, operation of the structure will be explained. When the pair of rubber plug guides 18, 19 are positioned at the closed position illustrated in FIGS. 5, 6 and one of the rubber plug holding rods 10a of the rotary unit 10 is positioned to face the rubber plug feeding unit 11 according to its rotational movement, the pair of rubber plug guides 18, 19 are moved at the closed position illustrated in FIGS. 7, 8. The guide space is formed by the respective guide grooves 18a, 19a of the pair of rubber plug guides 18, 19. Next, the pushing rod 17 positioned at the lower position is moved upward so that the rubber plug 15 in the rubber plug feeding port 16a is moved upward in the guide space. Here, the rubber plug 15 is moved while an outer periphery thereof is being guided by the respective guide grooves 18a, 19a. In the course of this movement, the rubber plug holding rod 10a is inserted into a wire passing-through hole 15a of the rubber plug 15. Then, insertion of the rubber plug holding rod 10a into the rubber plug 15 is limited or stopped at a position where an upper end face of the rubber plug 15 abuts on the stopper portions 18b, 19b.

Next, the pushing rod 17 which has pushed the rubber plug 15 is moved downward to the lower position and the pair of rubber plug guides 18, 19 are moved to the opened position illustrated in FIGS. 5, 6. Then, the rotary unit 10 is rotated at 90° in a clockwise direction and the rubber plug holding rod 10a holding the rubber plug 15 fitted thereon is stopped at the position of the rubber plug holder 12. The rubber plug holder 12 pulls the rubber plug 15 from the rubber plug holding rod 10a, and the rubber plug 15 which has been pulled out is fitted on the end portion Wa of the wire W. Such processing actions are performed on respective rubber plug holding rods 10a so that rubber plugs 15 are automatically fitted sequentially on end portions Wa of wires W. An outer cover of the end portion Wa of the wire W is stripped off after fitting of the rubber plug 15.

In the above operation course, as illustrated in FIG. 4B, the rubber plug 15 is fitted on the rubber plug holding rod 10a while an outer periphery of the rubber plug 15 is being guided by the respective guide grooves 18a, 19a of the pair of rubber plug guides 18, 19. Accordingly, when the inner diameter of the rubber plug 15 is small, the diameters of the respective guide grooves 18a, 19a may simply be reduced, so that there is no portion where rigidity is weak in the respective rubber plug guides 18, 19 and the rubber plug 15 can be performed without injuring parts or the like, which results in improvement in durability. In this manner, since such a trouble as a part injury does not occur and feeding of the rubber plug 15 is securely performed, a machine stoppage due to feeding failure is prevented, so that productivity can be improved.

Also, since fitting of one of the rubber plugs 15 on each rubber plug holding rods 10a is restricted by the respective stopper portions 18b, 19b provided above the upper portions of the respective guide grooves 18a, 19a, the rubber plug 15 is fitted on the rubber plug holding rods at a position where it abuts on the stopper portions 18b, 19b so that the rubber plug 15 can securely be fitted and positioned at a predetermined fitting position of each rubber plug holding rod 10a. Accordingly, unlike the conventional example, it is unnecessary to provide another positioning unit in addition to the rubber plug feeding unit 11, the structure of the rubber plug fitting apparatus is simplified, and manufacturing cost is reduced. Furthermore, since the rubber plug 15 is positioned and mounted on the predetermined fitted position of each rubber plug holding rod 10a, a delivery of the rubber plug 15 to the rubber plug holder 12 is securely performed at the next step. A machine stoppage due to feed failure is prevented, which also results in improvement in productivity. Also, since the positioning step of the rubber plug 15 can be omitted, which also results in improvement in productivity.

Furthermore, as set forth above, since lower face positions of the respective stopper portions 18b, 19b defines a position of the lower end face of the rubber plug 15 fitted on each rubber plug holding rod 10a, a fitting position of the rubber plug 15 on the rubber plug holding rod 10a can arbitrarily be adjusted by the position of the respective stopper portions 18b, 19b.

The entire contents of Japanese Patent Application P10-355093 (filed on Dec. 14, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A rubber plug fitting apparatus, comprising:
   a rubber plug feeding unit for feeding rubber plugs to a rubber plug feeding port;
   a rubber plug holder for holding one of the rubber plugs to fit the rubber plug on an end portion of a wire; and
   a rotary unit having a plurality of rubber plug holding rods, each of the rubber plug holding rods to be fitted into and to hold a rubber plug, the rotary unit moving each of the rubber plug holding rods between the rubber plug feeding unit and the rubber plug holder so that the rubber plugs held by the rubber plug holding rods can be delivered from the rubber plug feeding unit to the rubber plug holder,
   wherein a pair of rubber plug guides are provided at a side of the rubber plug feeding port of the rubber plug feeding unit, the pair of rubber plug guides being openable and closeable on each other; and
   wherein each of the pair of rubber plug guides has a guide groove for guiding an outer periphery of each of the rubber plugs from the rubber plug feeding port to a side of the rubber plug holding rod located at the rubber plug feeding port when the pair of rubber plug guides are closed.

2. A rubber plug fitting apparatus according to claim 1, wherein stopper portions are respectively provided at the respective guide grooves of the pair of rubber plug guides so that the stopper portions restrict movement stroke of the rubber plug where the rubber plug moves from the rubber plug feeding port to the side of the rubber plug holding rod.

* * * * *